United States Patent
Saber et al.

(10) Patent No.: US 11,723,023 B2
(45) Date of Patent: Aug. 8, 2023

(54) SYSTEM AND METHOD FOR MANAGING COLLISIONS IN MULTIPLE-TRANSMISSION-AND-RECEPTION-POINTS COMMUNICATIONS

(71) Applicant: Samsung Electronics Co., Ltd., Suwon-si (KR)

(72) Inventors: Hamid Saber, San Diego, CA (US); Jung Hyun Bae, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 17/222,787

(22) Filed: Apr. 5, 2021

(65) Prior Publication Data

US 2021/0352694 A1    Nov. 11, 2021

Related U.S. Application Data

(60) Provisional application No. 63/021,307, filed on May 7, 2020.

(51) Int. Cl.
*H04W 72/12* (2023.01)
*H04W 72/1273* (2023.01)

(52) U.S. Cl.
CPC .............. *H04W 72/1273* (2013.01)

(58) Field of Classification Search
CPC ................................ H04W 72/1273
See application file for complete search history.

(56) References Cited

U.S. PATENT DOCUMENTS

| | | | |
|---|---|---|---|
| 11,317,411 B2* | 4/2022 | Bagheri | H04W 72/048 |
| 2020/0052950 A1* | 2/2020 | Manolakos | H04L 5/0048 |

(Continued)

FOREIGN PATENT DOCUMENTS

| | | | | |
|---|---|---|---|---|
| EP | 3 709 744 A1 | 9/2020 | | |
| WO | WO-2020089009 A1 * | 5/2020 | | H04L 1/08 |
| WO | 2020198667 A1 | 10/2020 | | |

OTHER PUBLICATIONS

EPO Extended Search Report dated Feb. 4, 2022, for corresponding European Patent Application No. 21167778.6 (25 pages).

(Continued)

*Primary Examiner* — Rasheed Gidado
(74) *Attorney, Agent, or Firm* — Lewis Roca Rothgerber Christie LLP

(57) ABSTRACT

A method of managing multiple transmission and reception point (M-TRP) communications includes receiving, by a user equipment (UE), a plurality of PDSCH communications, wherein: a first subset of the plurality of PDSCH communications is associated with a first TRP, and a second subset of the plurality of PDSCH communications is associated with a second TRP different from the first TRP. The method further includes selecting a first set of one or more PDSCH communications to decode by applying a first management process for the first subset of PDSCH communications; selecting a second set of one or more PDSCH communications to decode by applying a second management process for the second subset of PDSCH communications; and decoding the first set of one or more PDSCH communications to decode and the second set of one or more PDSCH communications to decode.

20 Claims, 12 Drawing Sheets

(56) References Cited

U.S. PATENT DOCUMENTS

| | | | |
|---|---|---|---|
| 2020/0092068 A1* | 3/2020 | Yang | H04L 5/0044 |
| 2020/0205141 A1 | 6/2020 | Khoshnevisan et al. | |
| 2020/0287647 A1* | 9/2020 | Park | H04J 13/0074 |
| 2020/0322971 A1 | 10/2020 | Jung et al. | |
| 2020/0389897 A1* | 12/2020 | Mondal | H04W 16/02 |
| 2021/0007088 A1 | 1/2021 | Zhou et al. | |
| 2021/0014026 A1 | 1/2021 | Papasakellariou | |
| 2021/0014727 A1* | 1/2021 | Wang | H04L 1/1832 |
| 2021/0022167 A1 | 1/2021 | Khoshnevisan et al. | |
| 2021/0143889 A1* | 5/2021 | Akoum | H04W 72/042 |
| 2021/0176776 A1* | 6/2021 | Choi | H04L 1/0011 |
| 2022/0311555 A1* | 9/2022 | He | H04L 1/1812 |
| 2023/0024369 A1* | 1/2023 | Abotabl | H04L 5/0044 |

OTHER PUBLICATIONS

3GPP TS 38.213, 3rd Generation Partnership Project; Technical Specification Group Radio Access Network; NR; "Physical layer procedures for control", V16.5.0, Mar. 30, 2021, pp. 1-183, Accessible: https://www.3gpp.org/ftp/Specs/archive/38_series/38.213/.

3GPP TS 38.331, 3rd Generation Partnership Project; Technical Specification Group Radio Access Network; NR; "Radio Resource Control (RRC) protocol specification", V16.4.1, Mar. 30, 2021, pp. 1-954, Accessible: https://www.3gpp.org/ftp/Specs/archive/38_series/38.331/.

EPO European Partial Search Report dated Sep. 23, 2021, issued in corresponding European Patent Application No. 21167778.6 (20 pages).

* cited by examiner

SYSTEM AND METHOD FOR MANAGING COLLISIONS IN MULTIPLE-TRANSMISSION-AND-RECEPTION-POINTS COMMUNICATIONS

CROSS-REFERENCE TO RELATED APPLICATION(S)

This application claims priority to and the benefit of U.S. Provisional Patent Application No. 63/021,307, filed in the United States Patent and Trademark Office on May 7, 2020, the entire disclosure of which is incorporated by reference herein.

FIELD

Certain embodiments described herein relate to systems and methods for processing or managing collisions in multiple-transmission-and-reception-points (M-TRP) communications.

BACKGROUND

In certain cellular communication protocols, such as those of the 3rd Generation Partnership Project (3GPP) Fifth Generation New Radio (5G-NR) specifications for cellular networks, downlink traffic from a network device or network system to user equipment (UE) (e.g., a smartphone, internet of things device, or other computing device or electronic device) can be wirelessly transmitted via a physical downlink shared channel (PDSCH), which can be dynamically scheduled (dynamic grant or DG) or semi-persistently scheduled (SPS).

In some implementations, different antenna ports of a multiple-input multiple-output (MIMO) cellular transmission scheme can involve a single TRP, in which case the scheme can be referred to as single TRP transmission scheme. Different antenna ports of one or different channels can also correspond to multiple TRPs, which may be non-co-located (e.g., physically spaced apart), in which case the scheme can be referred to as M-TRP. An example of such scenario is when a rank-2 PDSCH is transmitted by two antenna ports where the first port is within a first TRP (TRP1) and the second port is within a second TRP (TRP2).

In some implementations, a UE may be unable to support processing of multiple PDSCH communications from a single TRP that overlap (share at least one same time resource (e.g., at least a portion of each PDSCH communication is received by, or is scheduled for reception by, the UE over a same unit of time or over a same symbol in a given slot)) (regarding the term "overlap," as used herein, a single communication is not considered to "overlap" itself). In such cases, collision management may be implemented to "drop" or not decode one or more of the multiple PDSCH communications. However, in some implementations, a UE may be able to support processing of multiple PDSCH communications that are from different TRPs. In such a scenario, collision management can be complex, and improved collision management techniques (such as those described herein) would be helpful in this regard.

SUMMARY

According to one embodiment of the present disclosure, a method of managing multiple transmission and reception point (M-TRP) communications includes receiving, by a user equipment (UE), a plurality of PDSCH communications, wherein: a first subset of the plurality of PDSCH communications is associated with a first TRP, and a second subset of the plurality of PDSCH communications is associated with a second TRP different from the first TRP. The method further includes selecting a first set of one or more PDSCH communications to decode by applying a first management process for the first subset of PDSCH communications; selecting a second set of one or more PDSCH communications to decode by applying a second management process for the second subset of PDSCH communications; and decoding the first set of one or more PDSCH communications to decode and the second set of one or more PDSCH communications to decode.

According to another embodiment of the present disclosure, a method of managing multiple transmission and reception point M-TRP communications includes receiving, by a UE, a plurality of PDSCH communications each associated with a respective TRP; selecting a subset of one or more PDSCH communications to decode by applying a management process for the plurality of PDSCH communications, and decoding the subset of one or more PDSCH communications to decode. The management process includes selecting the subset of one or more PDSCH communications to decode such that: (i) no two PDSCH communications of the subset that are associated with a same TRP overlap, and (ii) each PDSCH communication of the subset overlaps with at most one other PDSCH communication of the subset associated with a particular TRP.

According to another embodiment of the present disclosure, a method of managing M-TRP communications includes receiving, by a UE, a plurality of PDSCH communications each associated with a respective TRP; selecting a subset of one or more PDSCH communications to decode by applying a management process for the plurality of PDSCH communications; and decoding the subset of one or more PDSCH communications to decode. Applying the management process includes: selecting a first PDSCH communication of the plurality of PDSCH communications, wherein the first PDSCH communication is associated with a first TRP; identifying a first subset of PDSCH communications of the plurality of PDSCH communications associated with the first TRP and overlapping the first PDSCH communication, and excluding the first subset of PDSCH communications from decoding; identifying a second subset of PDSCH communications of the plurality of PDSCH communications associated with a second TRP different from the first TRP and overlapping the first PDSCH communication; selecting a second PDSCH communication from the second subset of PDSCH communications for decoding, and excluding unselected PDSCH communications from the second subset of PDSCH communications from decoding; and excluding from decoding any of the plurality of PDSCH communications that overlap the second PDSCH communication from the second subset of PDSCH communications.

According to another embodiment of the present disclosure, a method of managing M-TRP communications includes receiving, by a UE, a plurality of PDSCH communications each associated with a respective TRP; selecting a subset of one or more PDSCH communications to decode by applying a management process for the plurality of PDSCH communications; and decoding the subset of one or more PDSCH communications to decode. Applying the management process includes initializing the plurality of PDSCH communications as a candidate set of PDSCH communications to decode; and iteratively, until an exit condition is reached, performing the following. (i) Identifying any PDSCH communications of the candidate set that are associated with a first TRP, and that do not overlap with any PDSCH communication of the candidate set associated with a second TRP different from the first TRP. (ii) (a) If one or more PDSCH communications are identified in (i), selecting as a first survivor PDSCH communication one of the identified one or more PDSCH communications, (b) otherwise, selecting as a first survivor PDSCH communication a PDSCH communication of the candidate set that has a lowest SPS configuration index. (iii) Including the first survivor PDSCH communication in the subset of one or more PDSCH communications to decode. (iv) Updating the candidate set by removing the first survivor, and removing any PDSCH communication of the candidate set that is associated with the first TRP and overlaps the first survivor. (v) Identifying any PDSCH communications of the candidate set that overlap the survivor PDSCH communication and that are associated with the second TRP, and if there are such PDSCH communications: selecting as a second survivor PDSCH communication one of the such PDSCH communications, and updating the candidate set by removing the such PDSCH communications, and removing any PDSCH communications of the candidate set that overlap the second survivor PDSCH communication and are associated with the second TRP.

BRIEF DESCRIPTION OF THE DRAWINGS

The accompanying drawings, together with the specification, illustrate certain example embodiments.

DETAILED DESCRIPTION

In the following detailed description, certain example embodiments are described by way of illustration. The present disclosure should not be construed as being strictly limited to the embodiments explicitly set forth herein.

Figure 1:
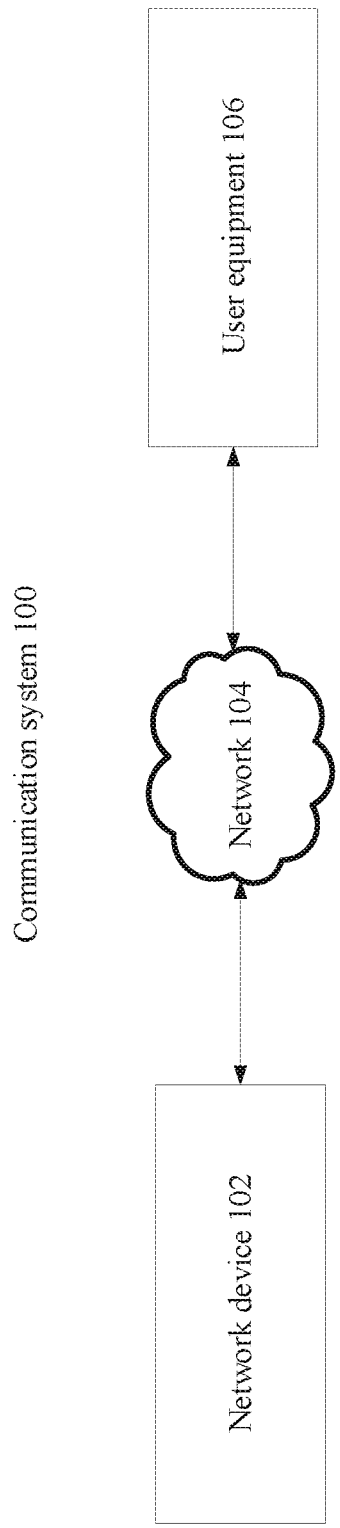
FIG. 1 shows an example communication system configured to provide communication between a network device and a UE, according to some embodiments.

FIG. 1 shows a communication system 100 that can be used for cellular communication (e.g., in accordance with an applicable 3GPP standard). The communication system 100 may include a network device 102, a network 104, and a UE 106. The techniques described herein may be implemented by the communication system 100 (or by one or more components thereof).

The network device 102 may be a gNB device, and may be configured to schedule transmissions between the gNB and the UE, and to communicate with one or more other gNBs. The network device 102 may be a 5G network device.

Note that the term "network device" may be used herein to refer to a network system, and a network device is not limited to referring to a single physical device, but may also refer to plurality of distributed devices (or components thereof) that perform networking functions. In some embodiments, the network device 102 may be a UE, and communications may be from UE to UE (e.g., via sidelink communications).

The network 104 may include, for example, a large area network (LAN), such as a cellular communication network. The UE 106 may include, for example, any device configured to communicate via the network 104 (e.g., a mobile device, a smartphone, a tablet, a desktop, a laptop, a local area network (LAN) device that serves local devices and that connects them the network 104 (such as a router), an internet of things device, or any other appropriate communication device). Note that the term UE is not necessarily limited to a device that is operated by a user, and may refer to devices that operate independent of user control. The UE 106 may be configured to decode received communications that it is capable of decoding.

In 3GPP NR technology, downlink traffic (e.g., from the network device 102 to the UE 106) can be send via either DG PDSCH or SPS PDSCH. A DG PDSCH communication is scheduled using a scheduling physical downlink control channel (PDCCH) communication to send downlink control information (DCI) to the UE 106. DCI can include, among other information, time and frequency resources in which UE 106 is scheduled to receive the PDSCH communication, and the UE 106 can make use of this information to properly receive the DG PDSCH communication (e.g., to reserve appropriate processing resources and perform reception protocols and processing of the received DG PDSCH communication).

SPS PDSCH communications can be employed by the UE 106 to receive PDSCH communications without requiring a respective scheduling DCI for each PDSCH communication (e.g., one communication may be used to establish a periodically repeating resource reservation that can be used for multiple SPS PDSCH communications). With SPS PDSCH protocols, a "g-nodeB" (5G network-side device or devices) configures the UE 106 (e.g., informs the UE 106 of the communication schedule/parameters) with one or more SPS configurations via radio resource control (RRC) messages. Such messages can include or indicate an SPS configuration information element (IE) per serving cell per bandwidth part (BWP), which includes, for example, periodicity, physical uplink control channel (PUCCH) resource information and other information used for SPS operation.

An SPS configuration (including, for example, a periodic schedule for SPS PDSCH communications) can be activated by an activation DCI. An SPS activation DCI may be scrambled using a configured grant radio network temporary identifier (CS-RNTI) and some specific DCI fields are specially used for identification of SPS activation, including new data indicator (NDI), hybrid automatic repeat request (HARD) process number (HPN) and redundancy version (RV). The SPS activation DCI can schedule the first SPS PDSCH occasion similarly, in certain regards, to how a DG DCI schedules a DG PDSCH. The SPS occasions that follow the SPS activation can be determined according to the periodicity IE in the SPS configuration and the time and frequency domain resource indicated by the activation DCI.

MIMO transmission schemes can be used in digital communication to increase the capacity of wireless channel. The 3GPP mobile communication standard supports MIMO transmission schemes where a PDSCH or physical uplink shared channel (PUSCH), among other types of channels and signals, may be transmitted from different physical antennas or different antenna ports.

Regarding M-TRP transmissions and DCIs, M-TRP transmissions can be categorized into single-DCI and multi-DCI M-TRP. With single-DCI M-TRP, a single PDCCH communication is transmitted from one of the TRPs and schedules one or multiple PDSCH communications. In one transmission scheme, different layers of a single PDSCH communication are transmitted from different TRPs. In other transmission schemes multiple PDSCH communications (multiplexed in time or frequency domain) with the same transport block (TB) are transmitted and all the layers of a PDSCH are transmitted from one of the TRPs. Different ones of these PDSCHs may be transmitted from different TRPs according to a pattern. With multi-DCI M-TRP, each TRP transmits its own PDCCH which schedules a PDSCH which is also transmitted from the ports within the same TRP.

Provided herein are techniques for managing collisions or potential collisions between different PDSCH communications from two or more TRPs (note that while some examples herein are described with respect to PDSCH communications associated with two TRPs, certain implementations can be extended to scenarios involving three or more TRPs, as appropriate). These techniques can be used to enable reception, by a UE 106, of more PDSCH communications than certain other techniques (e.g., by enabling the UE 106 to drop less PDSCH communications, or by scheduling PDSCH communications that are spread out (temporally speaking) and thus might be easier for the UE 106 to process).

Some comparative implementations involve multiple active SPS configurations per serving cell per bandwidth part (BWP) to support different use cases (e.g., uRLLC applications). When a UE 106 has multiple active SPS configurations per cell, it may receive multiple SPS PDSCHs which overlap in time. In these comparative implementations, for a UE 106 that does not support processing multiple overlapping PDSCH communications, specific SPS PDSCH communications may be chosen to decode by the UE 106, and other SPS PDSCH communications may be dropped.

In certain Multi-DCI Multi-TRP schemes, every DG or SPS PDSCH communication is associated with one TRP according to a scheduling/activation PDCCH via a higher layer parameter in the CORESET configuration. Every CORESET configuration contains an RRC parameter CORSETPoolIndex which takes values of 0 or 1, for example (in some embodiments, more than two TRPs can be involved, and the index can take more than two possible values, accordingly). If the scheduling PDCCH is in a search space associated with a CORESET with CORSETPoolIndex=0/1, it is assumed that the first/second TRP has transmitted the DG PDSCH. Similarly, if the activation PDCCH of a SPS PDSCH is in a search space associated with a CORESET with CORSETPoolIndex=0/1, it is assumed that the first/second TRP has transmitted the SPS PDSCH.

In certain Multi-TRP operations, a UE 106 may declare the capability to process two overlapping PDSCHs (DG or SPS) that are associated with different TRPs. In the case of SPS overlaps, or DG and SPS overlaps, the UE 106 can be configured in an improved manner to appropriately select which communications to decode, and which to drop, and the UE 106 may decode the selected communications accordingly. Some example embodiments provide methods to resolve the collision among DG and SPS PDSCHs with different configuration indices and CORSETPoolIndex values.

Figure 2A:
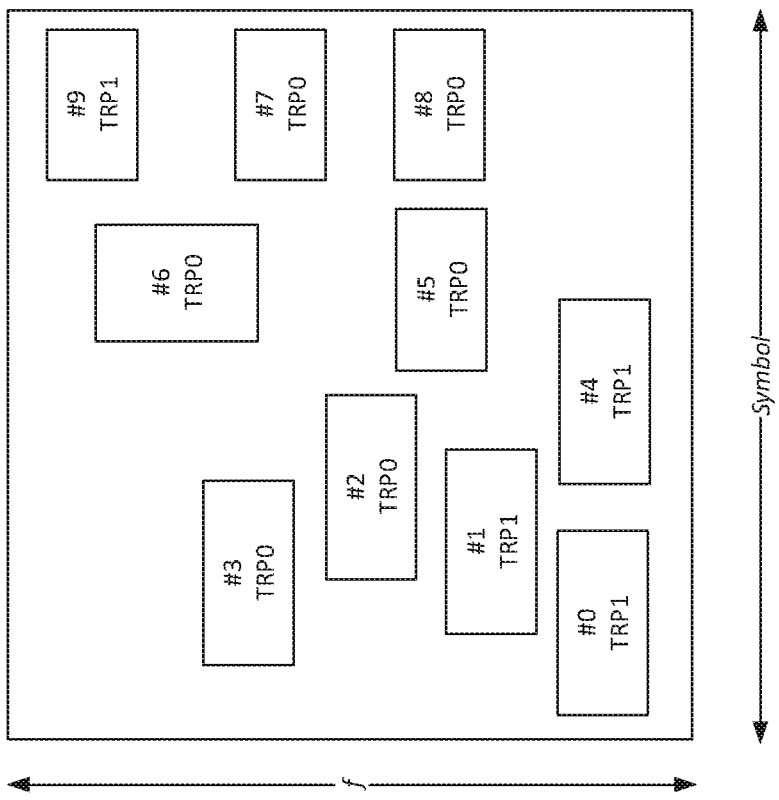
FIG. 2A shows an example of PDSCH communications received by a UE, according to some embodiments.

FIG. 2A shows an example embodiment of a set of PDSCH communications 202. The PDSCH communications 202 may be sent by a gNB (e.g., the network device 102) to a UE (e.g., the UE 106). The PDSCH communications 202 are scheduled to use certain resources, such as time and frequency resources, as shown in FIG. 2A. The PDSCH communications 202 each have an SPS configuration index number (in other embodiments, other identifiers may be used), ranging in the depicted example from #0 to #9. The SPS configuration index number can be a number assigned to a PDSCH communication by a gNB. The PDSCH communications 202 are each associated with a TRP (e.g., TRP0 or TRP1) from which they were transmitted, and the respective PDSCH communications may include an indication of their associated TRPs (e.g., may have CORESETPoolIndex values that indicate this, as discussed above). In some implementations, each CORESET may be configured by a gNB to have CORESETPoolIndex with a value of 0 or 1. A CORESET with value of CORESETPoolIndex=0 can be associated with the first TRP while a CORESET with a value of CORESETPoolIndex=1 can be associated with the second TRP. If CORESETPoolIndex is not configured for a CORESET, it can be assumed the CORESETPoolIndex is 0 for that CORESET. A DG PDSCH communication can be associated with a TRP through the CORESET in which the scheduling PDCCH communication is transmitted. A SPS PDSCH communication can be associated with a TRP through the CORESET in which the activation PDCCH communication is transmitted. Therefore, every PDSCH can have a unique association with a TRP.

The x-axis depicted in FIG. 2A enumerates orthogonal frequency division multiplexing (OFDM) symbols in which the PDSCH communications 202 are received, which corresponds directly to timings at which (and over which) the PDSCH communications 202 are received by the UE 106. The x-axis in the depicted example spans one slot, and the PDSCH communications 202 may include all PDSCH communications received in the slot. The y-axis depicted in FIG. 2A enumerates frequencies at which the PDSCH communications are transmitted.

As shown in FIG. 2A, certain PDSCH communications may overlap each other in the time domain (may extend over one or more same symbols as another PDSCH communication), although such overlapping PDSCH communications differ in frequency. As discussed above, a UE 106 may not be able to process overlapping PDSCH communications that are associated with a same TRP (e.g., may not be able to process PDSCH communication #0 (associated with TRP 1) and PDSCH communication #1 (also associated with TRP 1)), but some UEs may support processing (e.g., decoding) of overlapping PDSCH communications that are associated with different TRPs (e.g., PDSCH communication #0 (associated with TRP 1) and PDSCH communication #3 (associated with TRP 0)).

In such scenarios, it can be challenging for the UE to determine which PDSCH communications should be selected for decoding. Presented herein are techniques for managing overlaps or collisions in M-TRP scenarios.

Figure 2B:
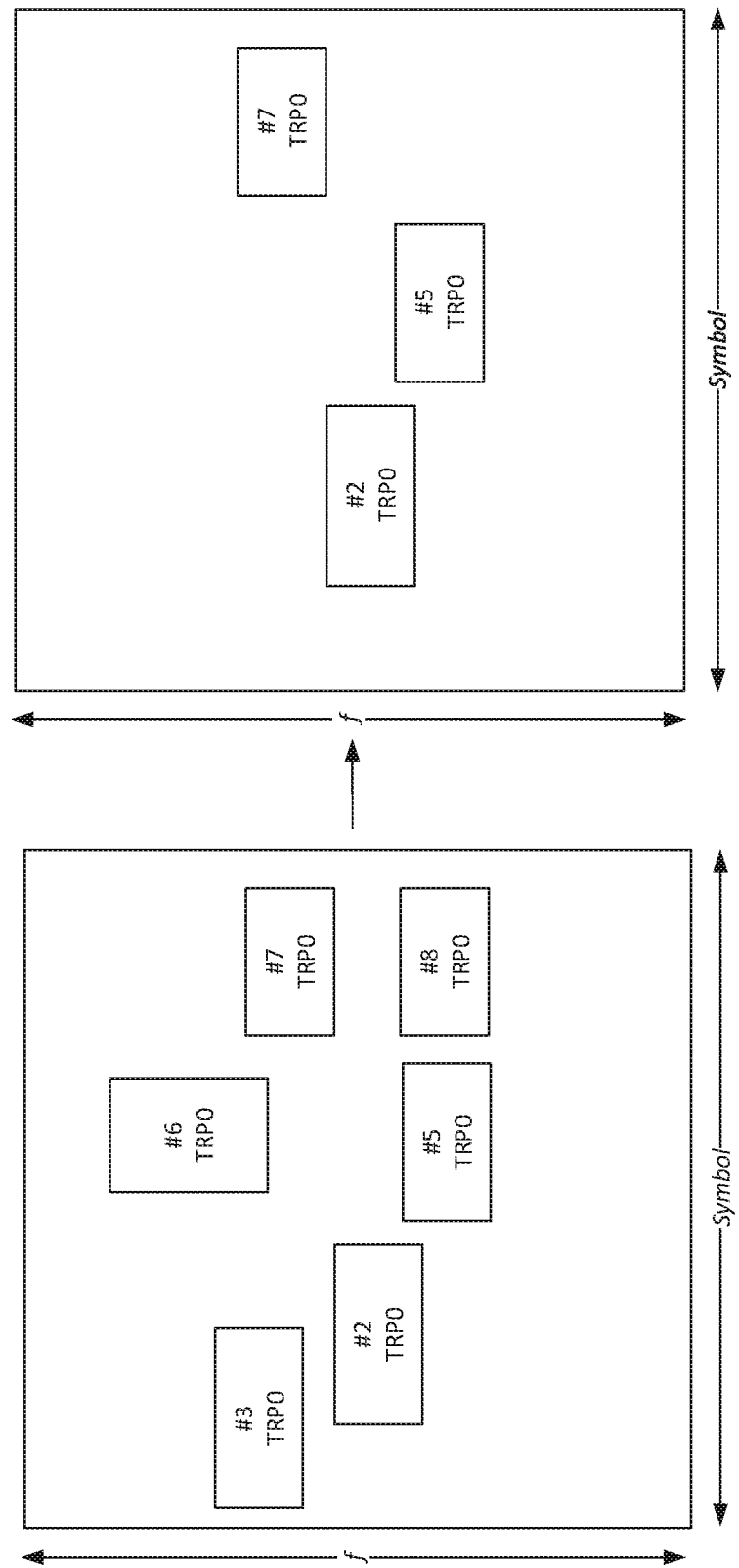
FIG. 2B through FIG. 2D show an example of a first method of managing M-TRP communications, according to some embodiments.
Figure 2C:
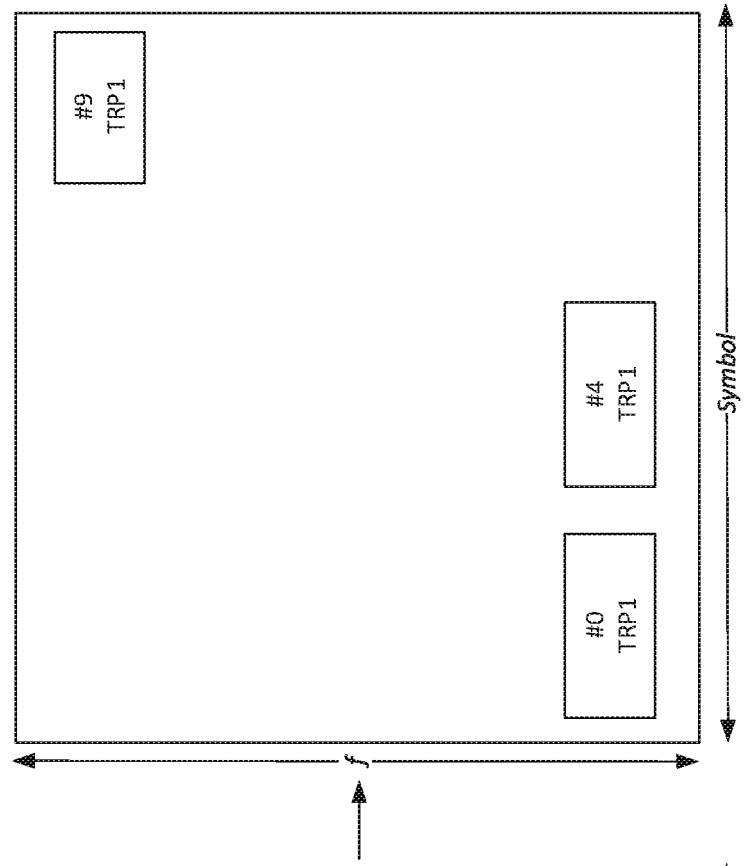
Figure 2C:
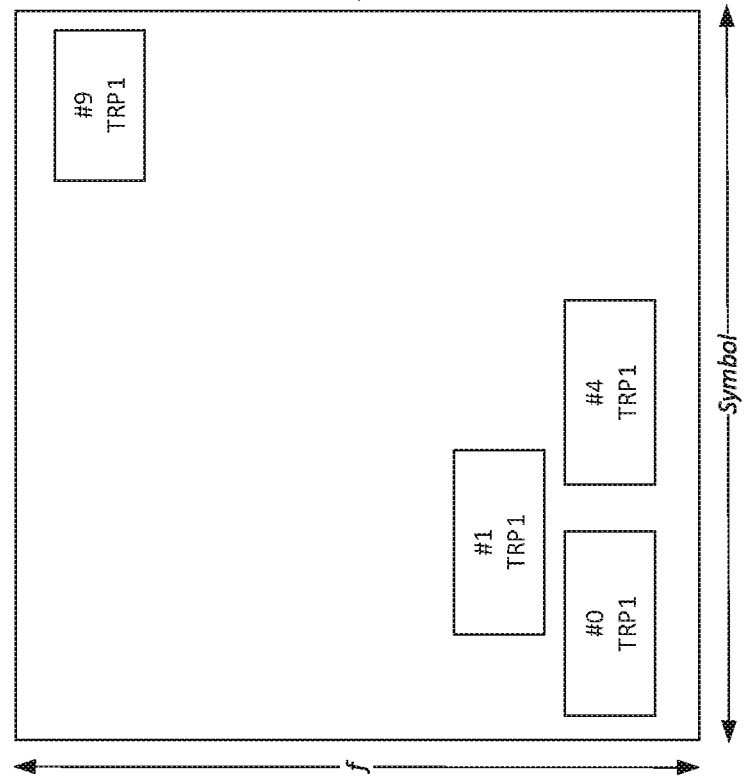
Figure 2D:
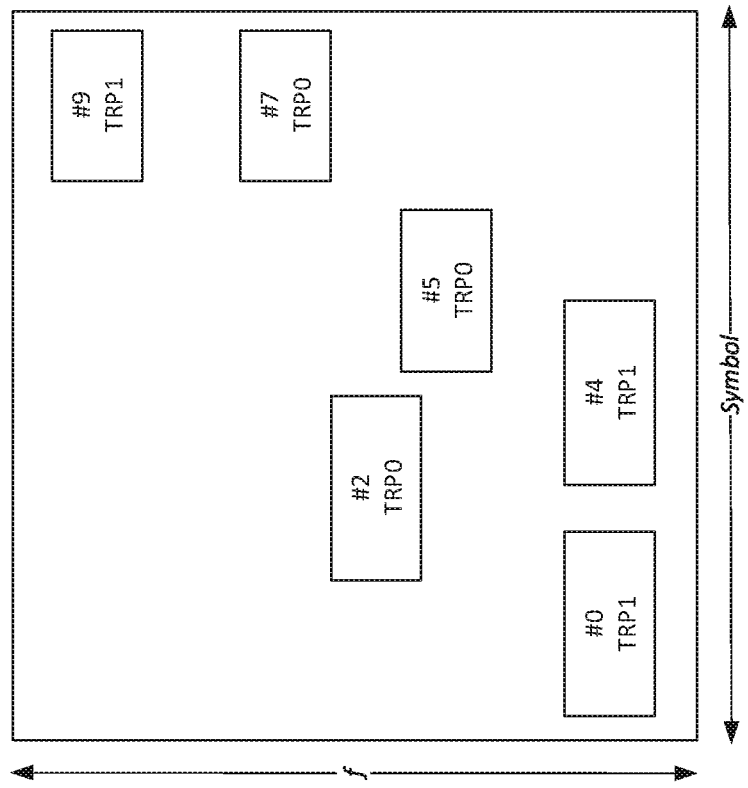

FIGS. 2B-2D show an example embodiment of a first method of managing M-TRP communications (in the depicted example, managing the PDSCH communications 202 shown in FIG. 2A). The first method of managing M-TRP communications involves independently, for each of the TRP0 and the TRP1, determining PDSCH communications that the UE 106 will decode.

FIG. 2B shows a set of received TRP0 PDSCH communications 204, which are the PDSCH communications of the PDSCH communications 202 that are associated with the TRP0. FIG. 2B also shows a set of decoded TRP0 PDSCH communications 206, which are TRP0 PDSCH communications that the UE 106 selects for decoding (in this case, PDSCH communications that are from a same TRP but do not overlap) and decodes. The decoded TRP0 PDSCH communications 206 can be determined according to the first method of managing M-TRP communications as follows.

(i) The UE 106 determines a first subset of the PDSCH communications 206 that are associated with the TRP0. This may be implementing using that CORESETPoolIndexes of the PDSCH communications 206. The UE 106 sets the first subset to be a decoding candidate group. (ii) The UE 106 selects, as a "survivor" PDSCH communication, from the decoding candidate group, one PDSCH communication of the first subset. For example, the UE 106 may select, as the survivor PDSCH communication, a PDSCH communication of the first subset having a lowest SPS configuration number. (iii) The UE 106 excludes from decoding (e.g., drops, or determines to not decode) all of the PDSCH communications of the decoding candidate group that overlap the survivor PDSCH communication. (ii) and (iii) may be iterated to generate a set of survivor PDSCH communications to decode, wherein between iterations, the UE 106 removes from the decoding candidate group the PDSCH communications that were excluded from decoding the PDSCH communication selected as a survivor PDSCH communication in the previous iteration. An exit condition for the iterations may be, for example, the reduced subset being empty, or a number of iterations being equal to a maximum number of unicast PDSCHs in a slot that that UE is capable of decoding. Thus, the UE 106 may select the set of survivor PDSCH communications for the TRP0 such that none of the PDSCH communications in the set of survivor PDSCH communications for the TRP0 overlap.

FIG. 2C shows a set of received TRP1 PDSCH communications 208, which are a subset of PDSCH communications of the PDSCH communications 202 that are associated with the TRP1. FIG. 2C also shows a set of decoded TRP1 PDSCH communications 210, which are TRP1 PDSCH communications that the UE 106 selects for decoding (in this case, PDSCH communications that are from a same TRP but do not overlap) and decodes. The decoded TRP1 PDSCH communications 210 can be determined (selected from the received TRP1 PDSCH communications 208) in a similar manner as used to determine the decoded TRP0 PDSCH communications 206, described above in reference to FIG. 2B. Thus, the UE 106 may select the set of survivor PDSCH communications for the TRP0 such that none of the PDSCH communications in the set of survivor PDSCH communications for the TRP0 overlap.

FIG. 2D shows decoded PDSCH communications 212, which are the PDSCH communications that the UE 106 selects for decoding and decodes. The decoded PDSCH communications 212 are PDSCH communications that the UE 106 has selected decode using the first method of managing M-TRP communications, and include all the decoded TRP0 PDSCH communications 206, and all the decoded TRP1 PDSCH communications 210. Note that the decoded PDSCH communications 212 do not include any overlapping PDSCH communications that are associated with the same TRP (which the UE 106 may not be able to handle), but do include some overlapping PDSCH communications that are associated with different TRPs (#2 and #4 overlap, and #4 and #5 overlap), which the UE 106 (in this example) is capable of handling, and which might have been dropped in certain comparative techniques (e.g., techniques that simply do not allow any overlaps). Thus, the first method of managing M-TRP communications may advantageously avoid selecting PDSCH communications for decoding that the UE 106 cannot handle, and may advantageously select PDSCH communications for decoding that the UE 106 can handle.

Figure 3A:
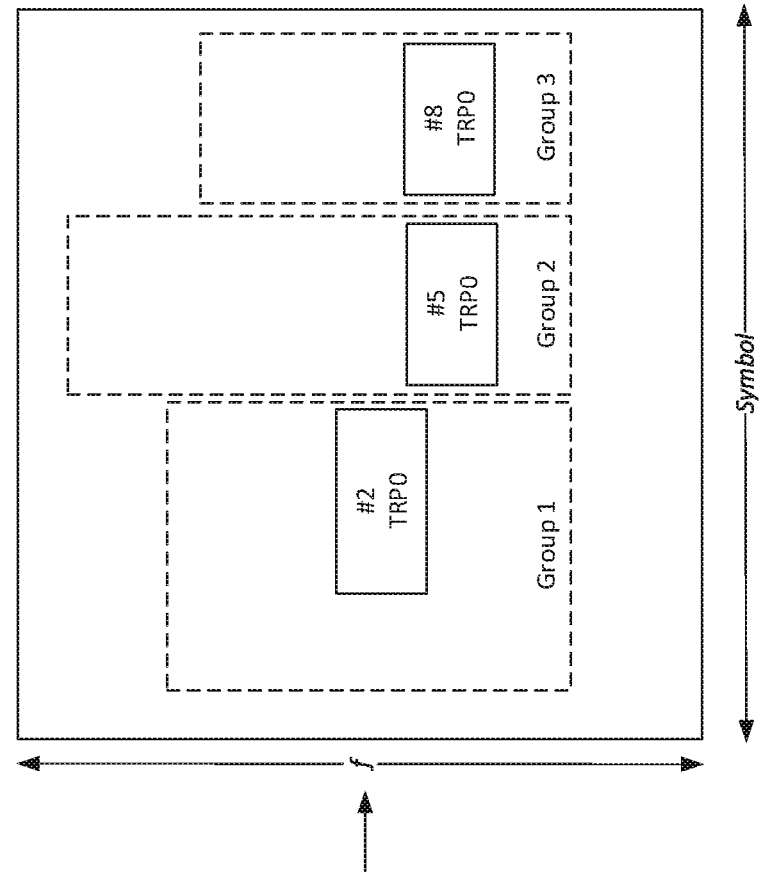
FIG. 3A through FIG. 3C show an example of a second method of managing M-TRP communications, according to some embodiments.
Figure 3A:
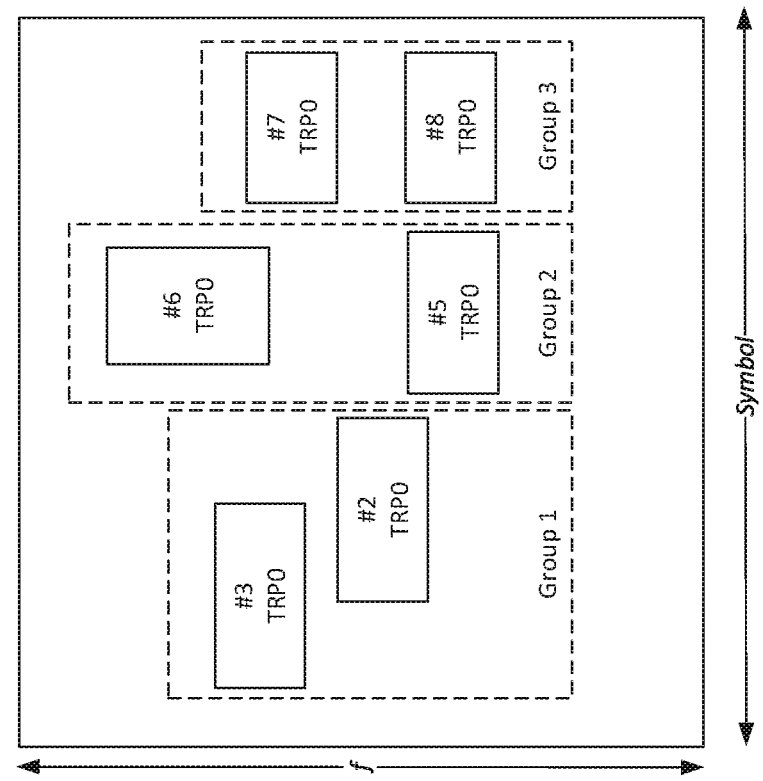
Figure 3B:
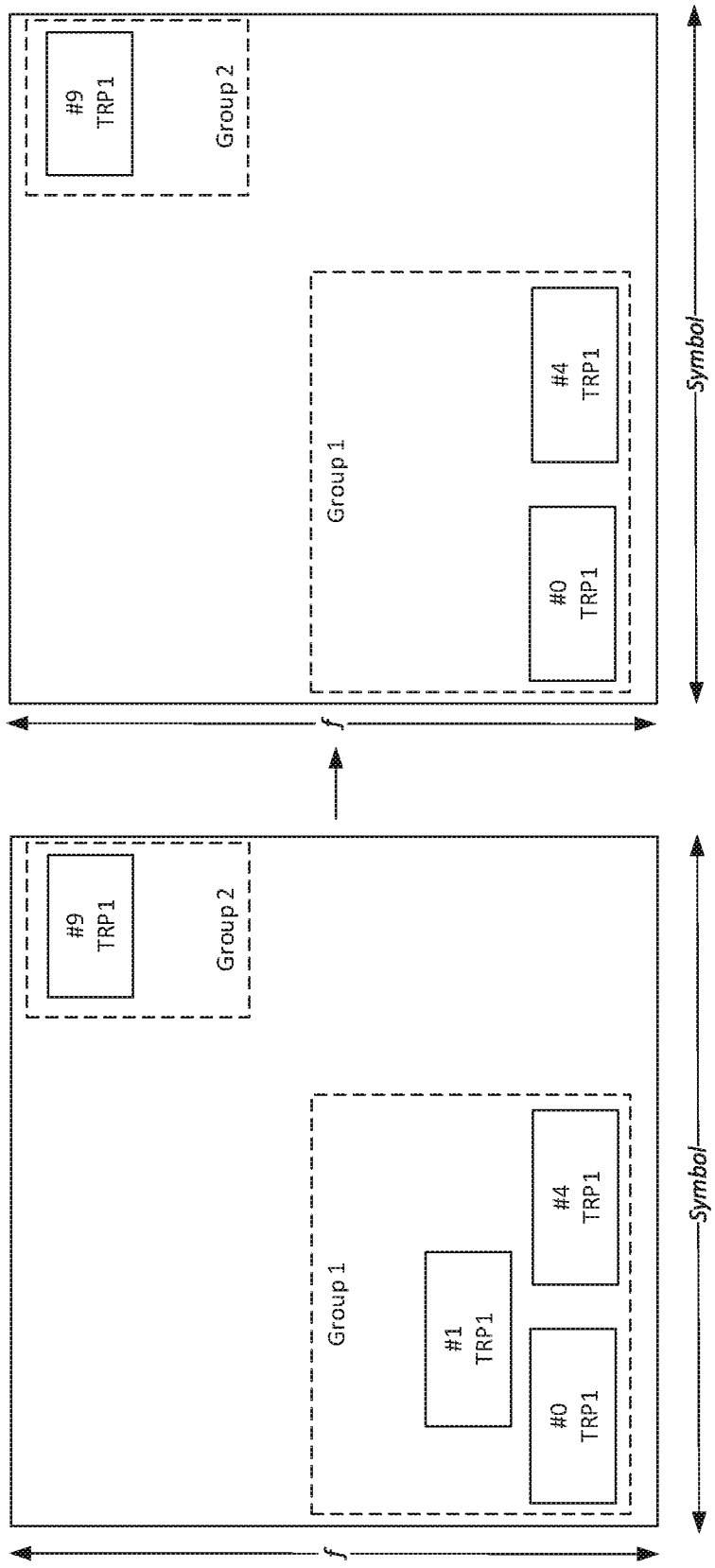
Figure 3C:
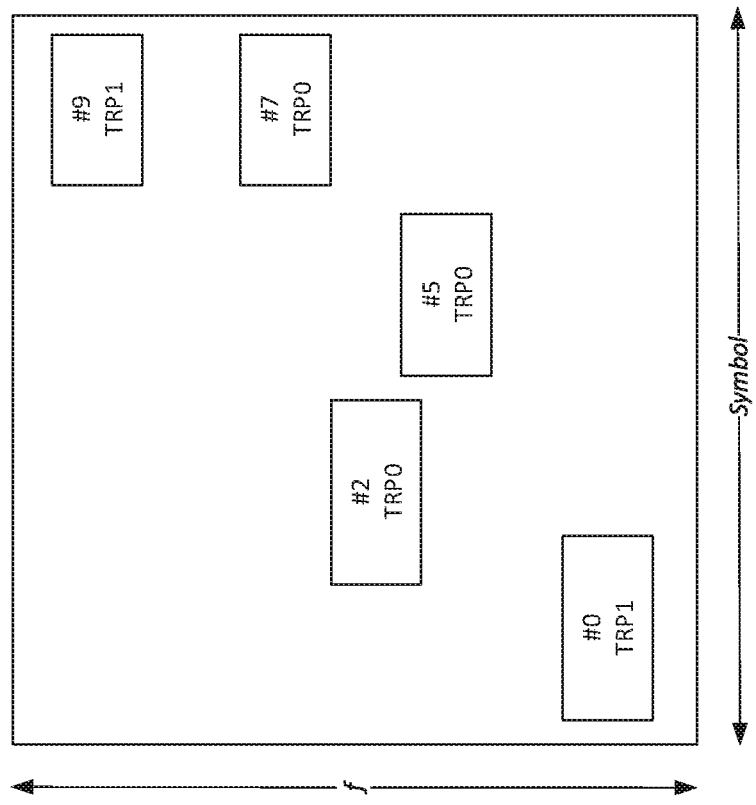

Referring now to FIGS. 3A-3C, FIGS. 3A-3C show an example embodiment of a second method of managing M-TRP communications (in this example, the PDSCH communications 202 shown in FIG. 2A). The second method of managing M-TRP communications, similarly to the first method, involves independently, for each of the TRP0 and the TRP1, determining PDSCH communications that the UE 106 will decode. As discussed in more detail in reference to FIG. 3C, the second method of managing M-TRP communications can provide for a set of PDSCH communications that is less burdensome for the UE 106 to decode, but can still include one or more overlapping PDSCH communications having associated with different TRPs.

FIG. 3A shows received TRP0 PDSCH communications 304. These are the same PDSCH communications included in the received TRP0 PDSCH communications 204 (all PDSCH communications of the PDSCH communications 202 that are associated with the TRP0). The second method of managing M-TRP communications involves grouping the TRP0 PDSCH communications 304 into groups of overlapping PDSCHs, and selecting one PDSCH communication from each group for decoding. In the depicted example, the TRP0 PDSCH communications 304 are grouped into groups 1-3.

A group of overlapping PDSCHs may be defined, by way of example and for purposes of implementing the second method of managing M-TRP communications, as a group that satisfies the following criteria. (A) Every PDSCH communication has a starting symbol number equal to or larger than the starting symbol number of a "first" or earliest PDSCH communication in that group (in case two or more PDSCH communications might qualify as "first" or earliest, one can be selected as appropriate (e.g., at random)). (B) Every PDSCH has an ending symbol number equal to or smaller than an ending symbol number of the "last" or latest SPS PDSCH in that group (in case two or more PDSCH communications might qualify as "last" or latest, one can be selected as appropriate (e.g., at random)). (C) Every PDSCH in the group overlaps with at least one other PDSCH in the group. Both starting and ending symbol of any given PDSCH in the group overlaps with at least one other PDSCH in the group, if the given PDSCH is neither the "first" nor the "last" PDSCH in the group.

According to the second method of managing M-TRP communications, the first group in the slot is obtained by considering any PDSCH with the earliest starting symbol in the slot. The last PDSCH of the first group is the one with the latest ending symbol such that the above conditions for a group hold. The second group of overlapping PDSCHs are obtained by excluding the PDSCHs in the first group and taking the same definition for start and last PDSCH. According to this methodology, the received TRP0 PDSCH communications 304 will be divided into groups 1-3 as shown in FIG. 3A.

FIG. 3A also shows decoded TRP0 PDSCH communications 306. These are PDSCH communications that the UE 106 selects for decoding and decodes, and are selected from the received TRP0 PDSCH communications 304 according to the second method of managing M-TRP communications. The UE 106 determines the decoded TRP0 PDSCH communications 306 by selecting one PDSCH communication from each group of overlapping PDSCH communications (e.g., by selecting one PDSCH communication from each group having a lowest SPS configuration index number), and excluding from decoding all other PDSCH communications in the groups.

FIG. 3B shows a set of received TRP1 PDSCH communications 308, which are the PDSCH communications of the PDSCH communications 202 that are associated with the TRP1. FIG. 3B also shows a set of decoded TRP1 PDSCH communications 310, which are TRP1 PDSCH communications that the UE 106 selects for decoding and decodes (in this case, PDSCH communications that are from a same TRP but do not overlap). The decoded TRP1 PDSCH communications 310 can be determined in a similar manner as used to determine the decoded TRP0 PDSCH communications 306, described above in reference to FIG. 3A.

FIG. 3C shows decoded PDSCH communications 312, which are PDSCH communications that the UE 106 has selected for decode (and decodes) using the second method of managing M-TRP communications, and include all of the decoded TRP0 PDSCH communications 306 and all of the decoded TRP1 PDSCH communications 310. Note that the second method of managing M-TRP communications, when processing the same received PDSCH communications 202 as the first method of managing M-TRP communications, excludes PDSCH communication #4 from decoding, unlike the first method. Generally speaking, the second method of managing M-TRP communications can further ease a processing burden of the UE 106, relative to the first method of managing M-TRP communications, by considering groups of overlapping PDSCH communications and decoding a single PDSCH communication from the group. In certain implementations, a UE 106 may have difficulty processing all of the decoded PDSCH communications 212 that are selected for decoding using the first method of managing M-TRP communications (including the PDSCH communication #4), even though the decoded PDSCH communications 212 do not include overlapping PDSCH communications associated with a same TRP, because there are many PDSCH communications that need to be processed in quick succession. The second method of managing M-TRP communications can alleviate this difficulty for the UE 106, relative to the first method of managing M-TRP communications.

Third, fourth, and fifth methods of managing M-TRP communications are described in the following. These methods of managing M-TRP communications do not require independently processing PDSCH communications associated with different TRPs. The fifth method can guarantee, and the third and fourth methods can result in, a favorable processing situation wherein the UE 106 selects PDSCH communications such that: (i) no two PDSCH communications selected for decoding and associated with a same TRP overlap, and (ii) each PDSCH communication selected for decoding overlaps with at most one other PDSCH communication associated with a particular TRP. This can advantageously provide for a reasonably manageable set of PDSCH communications for the UE 106 to decode. In some embodiments, the UE 106 may implement the third or fourth method to select PDSCH communications, and may determine whether the selected PDSCH communications satisfy conditions (i) and (ii) described above. If the selected PDSCH communications do not satisfy conditions (i) and (ii), the UE 106 may responsively implement a remediation method of selecting PDSCH communications to decode, to attempt to satisfy conditions (i) and (ii). The remediation method of selection can be any appropriate method, such as one of the methods of managing M-TRP communications described herein.

Figure 4:
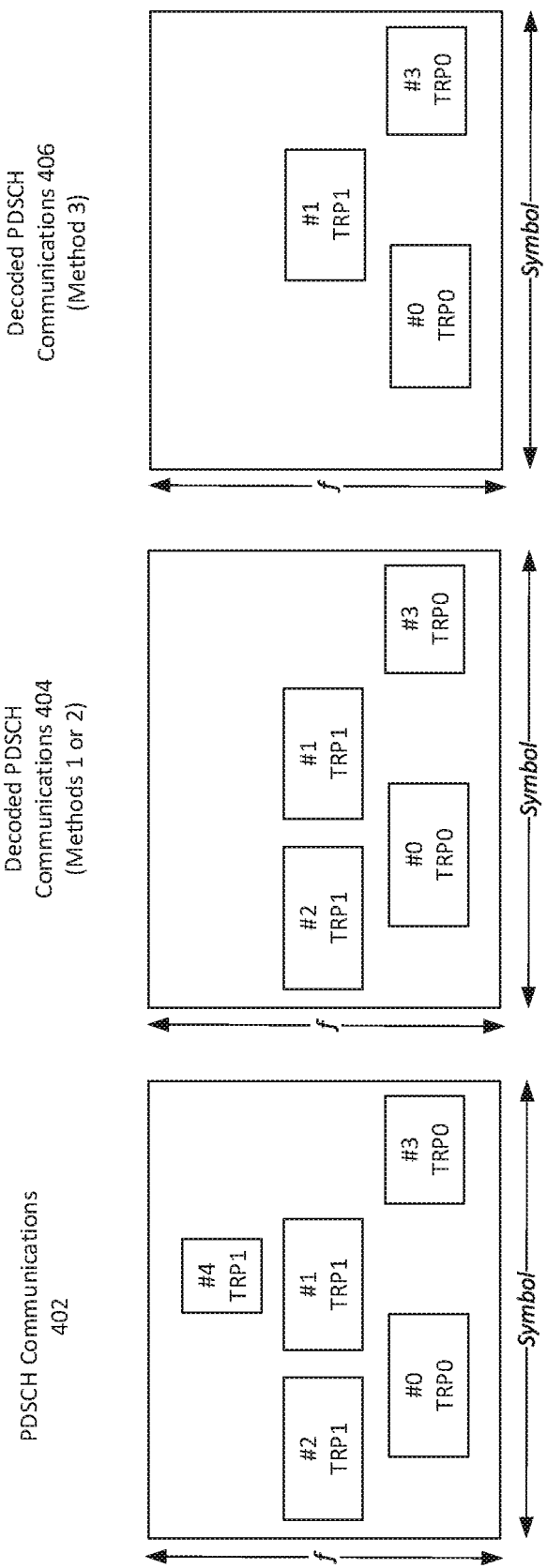
FIG. 4 shows an example of a third method of managing M-TRP communications, according to some embodiments.

Referring now to FIG. 4, FIG. 4 shows an example embodiment of a third method of managing M-TRP communications. FIG. 4 shows PDSCH communications 402 received by the UE 106, which include some overlapping M-TRP PDSCH communications. FIG. 4 also shows decoded PDSCH communications 406, which the UE 106 selects for decoding from the PDSCH communications 402 and decodes according to the third method of managing M-TRP communications. FIG. 4 further shows decoded PDSCH communications 404 for reference, which are the PDSCH communications that the UE 106 would have selected for decoding using the first or second method of managing M-TRP communications. As can be seen in FIG. 4, the use of the third method results in the additional dropping of PDSCH communication #2 (relative to the use of the first or second methods).

The third method of managing M-TRP communications can include the UE 106 selecting a PDSCH communication of the decoded PDSCH communications 406 (e.g., a PDSCH communication having a lowest SPS configuration index number in the first subset, which is #0 in the depicted example), wherein the selected PDSCH communication is associated with a first TRP (e.g., TRP0); identifying a first subset of PDSCH communications of the decoded PDSCH communications 406 associated with the first TRP and overlapping the selected PDSCH communication (in the depicted example, this subset is empty, as no PDSCH communications associated with TRP0 overlap #0); and excluding the first subset of PDSCH communications from decoding.

The third method of managing M-TRP communications can further include the UE 106 identifying a second subset of PDSCH communications of the decoded PDSCH communications 406 associated with a second TRP (e.g., TRP1) different from the first TRP and overlapping the selected PDSCH communication (e.g., #1 and #2, which overlap #0); selecting one PDSCH communication from the second subset of PDSCH communications for decoding (e.g., a PDSCH communication having a lowest SPS configuration index number in the second subset, which is #1 in the depicted example); excluding any other PDSCH communications from the second subset of PDSCH communications from decoding (e.g., excluding #2), and excluding from decoding any of the decoded PDSCH communications 406 that overlap the selected one PDSCH communication from the second subset of PDSCH communications (e.g., excluding #4, which overlaps #1).

The result of the above process is that #2, #4 are excluded from decoding, and #0, #1, and #3 are selected for decoding (and so decoded). This can provide for a reasonably manageable set of PDSCH communications for the UE 106 to decode.

Figure 5:
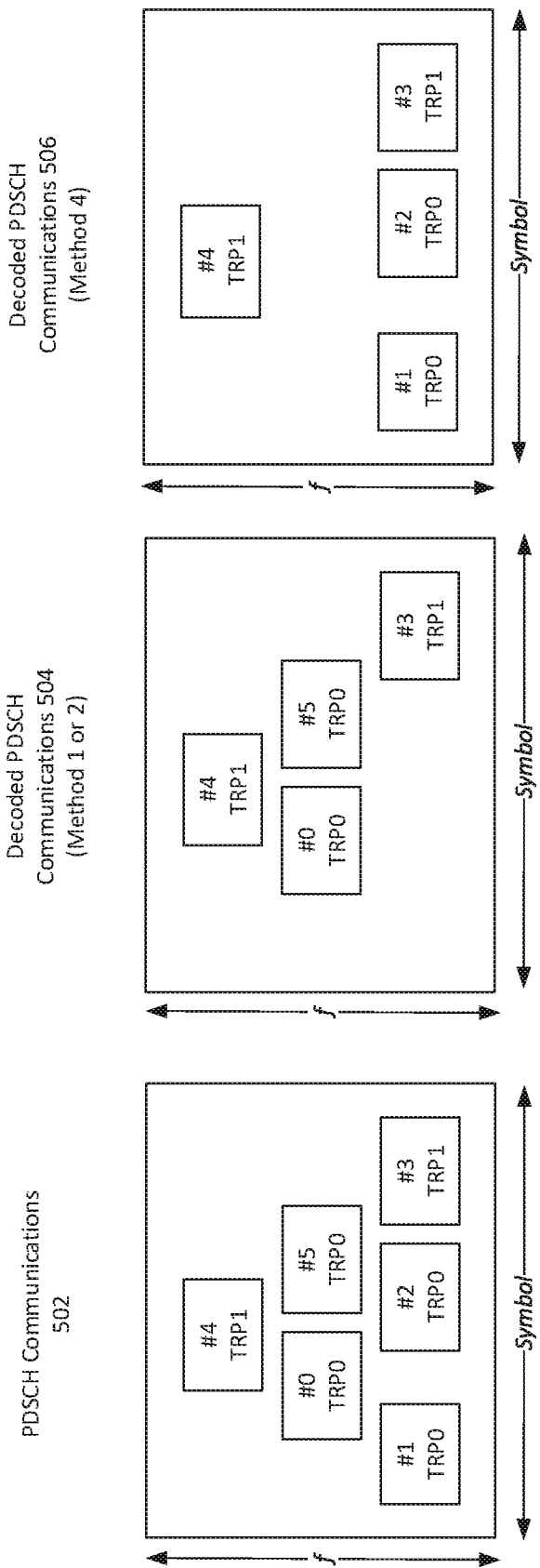
FIG. 5 shows an example of a fourth method of managing M-TRP communications, according to some embodiments.

Referring now to FIG. 5, FIG. 5 shows an example embodiment of a fourth method of managing M-TRP communications. FIG. 5 shows PDSCH communications 502 received by the UE 106, which include some overlapping M-TRP PDSCH communications. FIG. 5 also shows decoded PDSCH communications 506, which the UE 106 selects for decoding from the PDSCH communications 502 according to the fourth method of managing M-TRP communications. FIG. 5 further shows decoded PDSCH communications 504 for reference, which are the PDSCH communications that the UE 106 would have selected for decoding using the first or second method of managing M-TRP communications. As can be seen in FIG. 5, the use of the fourth method results in different PDSCH communications being selected for decoding than would be the case if the first or second methods were used, which can be more manageable for the UE 106 to handle (e.g., because for each PDSCH communication to be decoded, no more than one PDSCH communication associated with a different TRP overlaps).

The fourth method can include the UE 106 initializing a subset of candidate PDSCH communications to decode by setting the subset of candidate PDSCH communications to be the PDSCH communications 502, and performing the following processes iteratively, until an exit condition is reached (e.g., an exit condition as described below).

(i): Identifying any PDSCH communications of the subset of candidate PDSCH communications that are associated with a first TRP (e.g., TRP0), and that do not overlap with any PDSCH communications of the subset of candidate PDSCH communications associated with a second TRP (e.g., TRP1) different from the first TRP. Note that as used herein, "identifying any PDSCH communications" that fulfil a certain condition or have a certain characteristic can include determining that no PDSCH communications fulfil the condition or have the characteristic. In the example depicted in FIG. 5, in a first iteration, the UE 106 identifies PDSCH communication #1.

(ii): (a) If one or more PDSCH communications are identified in (i) (e.g., #1), selecting as a first survivor PDSCH communication one of the identified one or more PDSCH communications (e.g., selecting a PDSCH communication that has a lowest SPS configuration index), (b) otherwise, selecting as a first survivor PDSCH communication one PDSCH communication of the subset of candidate PDSCH communications (e.g., the PDSCH communication that has a lowest SPS configuration index). In the depicted example, in a first iteration, (a) is implemented because PDSCH communication #1 has been identified in (i), and PDSCH communication #1 is selected as the first survivor PDSCH communication.

(iii) Including the first survivor PDSCH communication (e.g., #1) in a subset of one or more PDSCH communications to decode.

(iv) Updating the subset of candidate PDSCH communications to decode by removing the first survivor PDSCH communication (e.g., #1), and removing any PDSCH communication of the subset of candidate PDSCH communications that is associated with the first TRP (e.g., TRP0) and overlaps the first survivor. In the depicted example, in a first iteration, the PDSCH communication #1 would be removed as the first survivor, and the PDSCH #0 would also be removed.

(v) Identifying any PDSCH communications of the subset of candidate PDSCH communications that overlap the first survivor PDSCH communication and that are associated with the second TRP (e.g., TRP1), and if there are such PDSCH communications: (a) selecting, as a second survivor PDSCH communication, one of the such PDSCH communications (e.g., that has a lowest SPS configuration index number), and (b) if the exit condition is not reached, updating the subset of candidate PDSCH communications to decode by removing the such PDSCH communications, and removing any PDSCH communications of the subset of candidate PDSCH communications that overlap the second survivor PDSCH communication and are associated with the second TRP. In the depicted example, in a first iteration, the UE 106 identifies that there are no PDSCH communications that overlap #1 and that are associated with TRP1—thus, (a) and (b) are skipped.

The above processes (i)-(v) may be iterated until an exit condition is reached. For example, the exit condition can be that a number of completed iterations has reached a maximum number of PDSCH communications from two TRPs that the UE supports, or can be that the subset of candidate PDSCH communications has been updated to an empty subset.

The fourth method as described above can be used to select different PDSCH communications for decoding than would be the case if the first or second methods were used, which can be more manageable for the UE 106 to handle.

Figure 6:
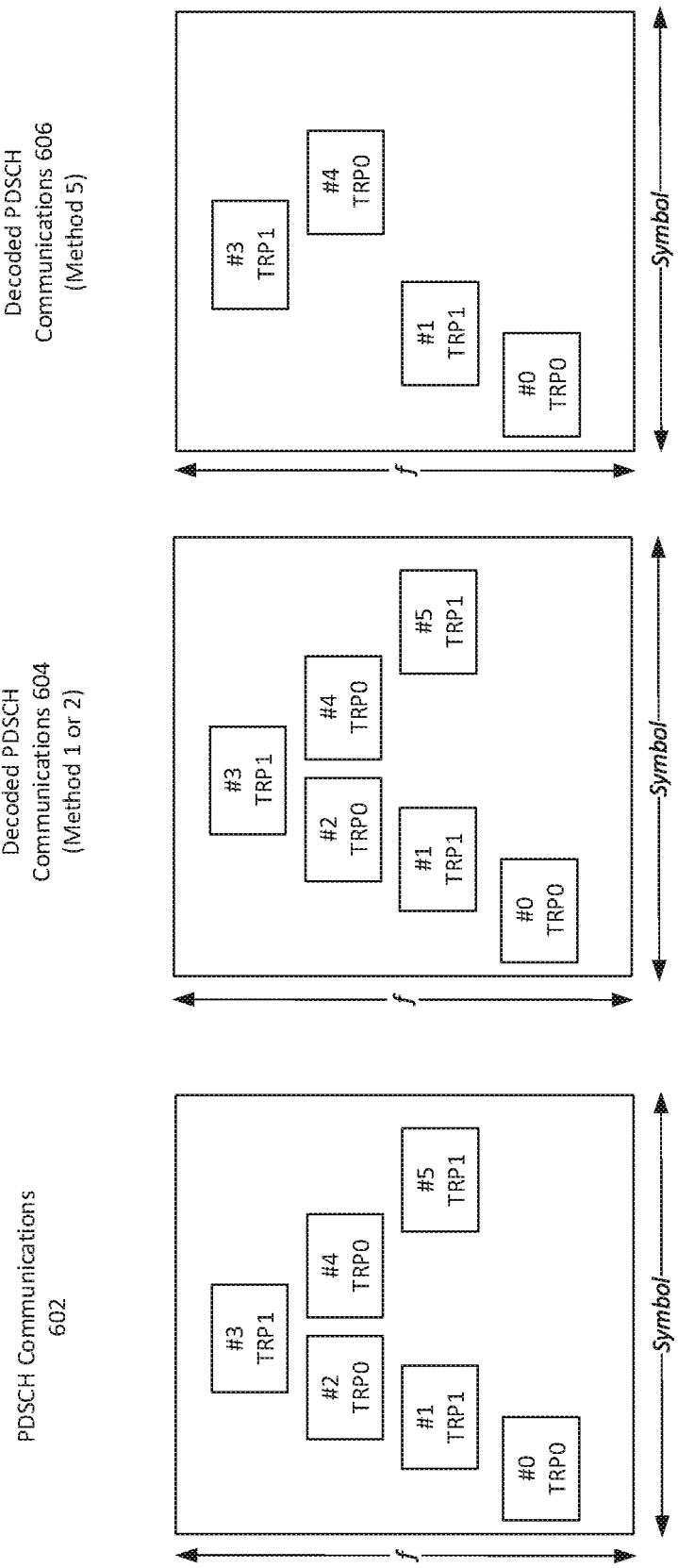
FIG. 6 shows an example of a fifth method of managing M-TRP communications, according to some embodiments.

Referring now to FIG. 6, FIG. 6 shows an example embodiment of a fifth method of managing M-TRP communications. FIG. 6 shows PDSCH communications 602 received by the UE 106, which include some overlapping M-TRP PDSCH communications. FIG. 6 also shows decoded PDSCH communications 606, which the UE 106 selects for decoding from the PDSCH communications 602 according to the fifth method of managing M-TRP communications. FIG. 6 further shows decoded PDSCH communications 604 for reference, which are the PDSCH communications that the UE 106 would have selected for decoding using the first or second method of managing M-TRP communications. As can be seen in FIG. 6, the use of the fifth method results in different PDSCH communications being selected for decoding than would be the case if the first or second methods were used, which can be more manageable for the UE 106 to handle (e.g., because for each PDSCH communication to be decoded, no more than one PDSCH communication associated with a different TRP overlaps).

The fifth method can include the UE 106 initializing a subset of candidate PDSCH communications to decode by setting the subset of candidate PDSCH communications to be the PDSCH communications 602, and performing the following processes iteratively, until an exit condition is reached (e.g., an exit condition as described below).

(i) Selecting, as a first survivor PDSCH communication, a PDSCH communication of the subset of candidate PDSCH communications that is associated with a first TRP (e.g., TRP0). The UE 106 may select a PDSCH communication of the subset of candidate PDSCH communications that is associated with a first TRP and that has a lowest SPS configuration index number. In the example depicted in FIG. 6, the UE 106 selects PDSCH communication #0 as the first survivor.

(ii) Including the first survivor PDSCH communication in the subset of one or more PDSCH communications to decode.

(iii) Identifying any PDSCH communications of the subset of candidate PDSCH communications to decode that overlap with the first survivor PDSCH communication and that are associated with a second TRP (e.g., TRP1) different from the first TRP, and if any such PDSCH communications are identified (e.g., PDSCH communication #1), selecting one such PDSCH communication (e.g., having a lowest SPS configuration index number) as a second survivor PDSCH communication and including the second survivor PDSCH communication in the subset of one or more PDSCH communications to decode. In the depicted example, the UE 106 selects PDSCH communication #1 as the second survivor.

(iv) If the exit condition is not reached, updating the subset of candidate PDSCH communications by: (a) removing the first survivor PDSCH communication (e.g., #0) and any PDSCH communication of the subset of candidate PDSCH communications that overlaps the first survivor PDSCH communication (e.g., #1 and #2); and (b) if any PDSCH communication was selected as a second survivor PDSCH communication (e.g., #1), removing the second survivor PDSCH communication (in the depicted example, #1 has already been removed, and thus the UE 106 does not need to take this action) and any PDSCH communication of the subset of candidate PDSCH communications that overlaps the second survivor PDSCH communication (e.g., #2 (in the depicted example, #3 has already been removed, and thus the UE 106 does not need to take this action) and #3).

The above processes (i)-(iv) may be iterated until an exit condition is reached. For example, the exit condition can be that a number of completed iterations has reached a maximum number of PDSCH communications from two TRPs that the UE supports, or can be that the subset of candidate PDSCH communications has been updated to an empty subset.

The fifth method as described above can be used to select different PDSCH communications for decoding than would be the case if the first or second methods were used, which can be more manageable for the UE 106 to handle (e.g., because for each PDSCH communication to be decoded, no more than one PDSCH communication associated with a different TRP overlaps).

In reference to the above-described methods of managing M-TRP communications, some of the examples described herein involve making use of the SPS configuration index number of the PDSCH communications. In other embodiments, a different index number or a different identifier can be used. In some embodiments, the PDSCH communications that are received by the UE 106 and that are processed using the methods of managing M-TRP communications described herein can include one or more DG PDSCH communications and one or more SPS PDSCH communications. The examples described above that involve making use of the SPS configuration index number of the PDSCH communications can be implemented for such a mixed set of received PDSCH by, for example, assigning an SPS configuration index number (or other identifier or index number) to the DG PDSCH communications (such an SPS configuration index number may be referred to as a dummy SPS configuration index number). In some embodiments in which selection of PDSCH communications to decode involves selecting a PDSCH communication having a lowest SPS configuration index number, the DG PDSCH communications can be prioritized by assigning to them SPS configuration index numbers that are lower than any of the SPS configuration index number of the SPS PDSCH communications. For example, if the lowest SPS configuration index number of the SPS PDSCH communications is 0, then the DG PDSCH communications can be assigned negative SPS configuration index numbers. The DG PDSCH communications numbers can be assigned as appropriate (e.g., randomly, possibly while also being made to comply with the above restriction).

Figure 7:
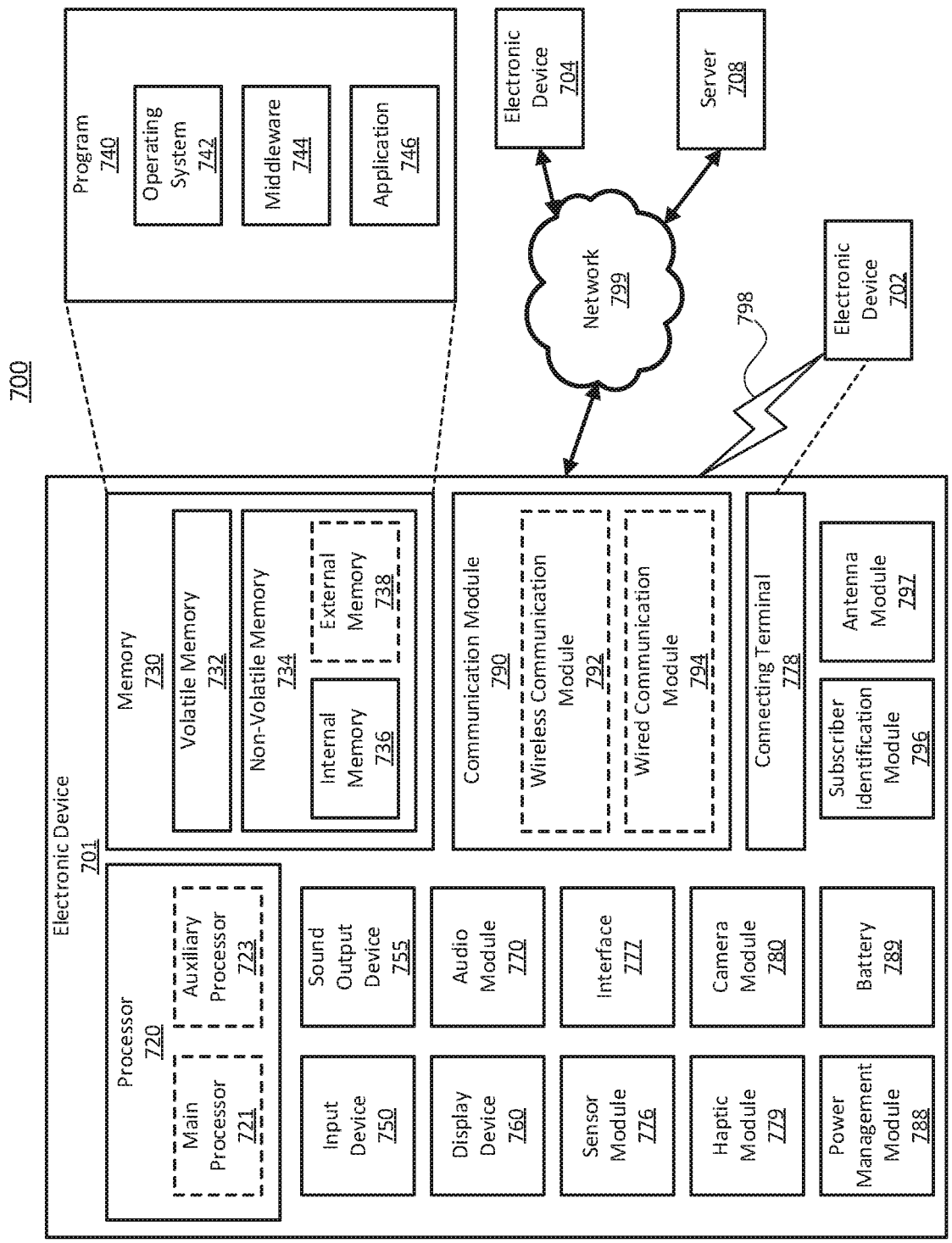
FIG. 7 shows an example of a system configured for processing or managing collisions in M-TRP communications, according to some embodiments.

FIG. 7 shows an example of a system 700 configured to manage M-TRP collisions, according to some embodiments. Referring to FIG. 7, the electronic device 701 (which may be similar to, or the same as, the UE 106) in the network environment 700 may communicate with an electronic device 702 via a first network 798 (e.g., a short-range wireless communication network, such as a Wi-Fi network), or an electronic device 704 or a server 708 (which may be similar to, or the same as, the network device 102) via a second network 799 (which may be similar to, or the same as, the network 104), such as a long-range wireless communication network (e.g., a cellular communication network, such as a 5G network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, and/or an antenna module 797. In one embodiment, at least one of the components (e.g., the display device 760 or the camera module 780) may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display), or the display device 760 may include one or more sensors in addition to the sensor module 776.

In some embodiments, the electronic device 701 may include a computing device or processor configured to implement M-TRP collision management, such as the methods of managing M-TRP communications described herein.

The processor 720 may execute, for example, software (e.g., a program 740) to control at least one other component (e.g., a hardware or a software component) of the electronic device 701 coupled with the processor 720, and may perform various data processing and/or computations. As at least a part of the data processing and/or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, and/or execute a particular function. The auxiliary processor 723 may be implemented as being separate from, or as a part of, the main processor 721.

The auxiliary processor 723 may control at least some of the functions or states related to at least one component (e.g., the display device 760, the sensor module 776, or the communication module 790) from among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as a part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 and/or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, and/or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or as a part of, the speaker.

The display device 760 may visually provide information to the outside (e.g., a user) of the electronic device 701. The display device 760 may include, for example, a display, a hologram device, and/or a projector and control circuitry to control a corresponding one of the display, the hologram device, and the projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, and/or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 and/or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, and/or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, and/or an audio connector (e.g., a headphone connector).

The haptic module 779 may convert an electrical signal into a mechanical stimulus (e.g., a vibration or a movement) and/or an electrical stimulus which may be recognized by a user via tactile sensation or kinesthetic sensation. According to one embodiment, the haptic module 779 may include, for example, a motor, a piezoelectric element, and/or an electrical stimulator.

The camera module 780 may capture a still image or moving images. According to one embodiment, the camera module 780 may include one or more lenses, image sensors, image signal processors, and/or flashes.

The power management module 788 may manage power supplied to the electronic device 701. The power management module 788 may be implemented as at least a part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, and/or a fuel cell.

The communication module 790 may support establishing a direct (e.g., wired) communication channel or a wireless communication channel between the electronic device 701 and the external electronic device (e.g., the electronic device 702, the electronic device 704, and/or the server 708) and performing communication via the established communication channel. The communication module 790 may include one or more communication processors that are operable independently from the processor 720 (e.g., the AP) and may support a direct (e.g., wired) communication and/or a wireless communication. According to one embodiment, the communication module 790 may include a wireless communication module 792 (e.g., a cellular communication module, a short-range wireless communication module, and/or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth®, wireless-fidelity (Wi-Fi) direct, and/or a standard of the Infrared Data Association (IrDA)) or the second network 799 (e.g., a long-range communication network, such as a cellular network, the Internet, and/or a computer network (e.g., LAN or wide area network (WAN)). Bluetooth® is a registered trademark of Bluetooth SIG, Inc., Kirkland, Wash. These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit and/or receive a signal and/or power to and/or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 and/or the second network 799, may be selected, for example, by the communication module 790 (e.g., the wireless communication module 792). The signal and/or the power may then be transmitted and/or received between the communication module 790 and the external electronic device via the selected at least one antenna.

At least some of the above-described components may be mutually coupled and communicate signals (e.g., commands and/or data) therebetween via an inter-peripheral communication scheme (e.g., a bus, a general purpose input and output (GPIO), a serial peripheral interface (SPI), and/or a mobile industry processor interface (MIPI)).

According to one embodiment, commands and/or data may be transmitted and/or received between the electronic device 701 and the external electronic device 704 via the server 708 coupled with the second network 799. Each of the electronic devices 702 and 704 may be a device of a same type as, or a different type from, the electronic device 701. All or some of operations to be executed at or by the electronic device 701 may be executed at one or more of the external electronic devices 702, 704, or the server 708. For example, if the electronic device 701 should perform a function and/or a service automatically, or in response to a request from a user or another device, the electronic device 701, instead of, or in addition to, executing the function and/or the service, may request the one or more external electronic devices to perform at least a part of the function and/or the service. The one or more external electronic devices receiving the request may perform the at least a part of the function and/or the service requested, and/or an additional function and/or an additional service related to the request, and transfer an outcome of the performing to the electronic device 701. The electronic device 701 may provide the outcome, with or without further processing of the outcome, as at least a part of a reply to the request. To that end, a cloud computing, distributed computing, and/or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Herein, embodiments of the present disclosure are described in detail with reference to the accompanying drawings. It should be noted that same or similar elements may be designated by the same reference numerals/letters even though they are shown in different drawings. In the description herein, specific details such as detailed configurations and components are provided to assist with the overall understanding of the embodiments of the present disclosure. Various changes and modifications of the embodiments described herein may be made without departing from the scope of the present disclosure. Certain detailed descriptions may be omitted for clarity and conciseness.

The present disclosure provides for various modifications and various embodiments. It should be understood that the present disclosure is not limited to the various embodiments explicitly described or detailed herein, and that the present disclosure includes modifications, equivalents, and alternatives within the scope of the present disclosure.

Although terms including an ordinal number such as first, second, etc., may be used for describing various elements, the elements are not restricted by such terms. Such terms are used to distinguish one element from another element, and do not imply any specific ordering. As used herein, the term "and/or" includes any and all combinations of one or more associated items. Singular forms are intended to include plural forms unless the context clearly indicates otherwise. In the present disclosure, it should be understood that the terms "include" or "have" indicate the existence of a feature, a number, a step, an operation, a structural element, a part, or a combination thereof, and do not exclude the existence or probability of the addition of one or more other features, numbers, steps, operations, structural elements, parts, or combinations thereof.

According to one embodiment, at least one component (e.g., a manager, a set of processor-executable instructions, a program, or a module) of the above-described components may include a single entity or multiple entities. One or more of the above-described components may be omitted, or one or more other components may be added. Alternatively or additionally, a plurality of components (e.g., a manager, a set of processor-executable instructions, a program, or a module) may be integrated into a single component. In this case, the integrated component may still perform one or more functions of each of the plurality of components in the same or similar manner as they are performed by a corresponding one of the plurality of components before the integration. Operations performed by the manager, the set of processor-executable instructions, the program, the module, or another component may be carried out sequentially, in parallel, repeatedly, or heuristically, or one or more of the operations may be executed in a different order or omitted, or one or more other operations may be added.

While certain references are made herein to the 3GPP 5G specification, the techniques disclosed herein can be applied to or extended to other specifications, including cellular specifications (whether 3GPP or otherwise), such as the 3GPP 4G or LTE specification, any cellular specification that follows 5G (e.g., a 6G specification).

What is claimed is:

1. A method of managing multiple transmission and reception point (M-TRP) communications, comprising:
  receiving, by a user equipment (UE), a plurality of physical downlink shared channel (PDSCH) communications, wherein:
    a first subset of the plurality of PDSCH communications is associated with a first TRP, and
    a second subset of the plurality of PDSCH communications is associated with a second TRP different from the first TRP;

selecting a first set of one or more PDSCH communications to decode and excluding at least one of the one or more PDSCH communications from decoding, by applying a first management process for the first subset of PDSCH communications;
selecting a second set of one or more PDSCH communications to decode by applying a second management process for the second subset of PDSCH communications; and
decoding the first set of one or more PDSCH communications to decode and the second set of one or more PDSCH communications to decode.

2. The method of claim 1, wherein the first set of one or more PDSCH communications to decode is selected such that none of the PDSCH communications of the first set of one or more PDSCH communications to decode overlap.

3. The method of claim 2, wherein applying the first management process comprises:
determining a decoding candidate group that comprises the first subset of PDSCH communications;
iteratively updating, until an exit condition is reached, the decoding candidate group by:
selecting a single PDSCH communication of the decoding candidate group, and including the selected single PDSCH communication in the first set of one or more PDSCH communications to decode;
removing any PDSCH communication that overlaps with the selected single PDSCH communication from the decoding candidate group; and
removing the selected single PDSCH communication from the decoding candidate group; and
setting the updated decoding candidate group as the first set of one or more PDSCH communications to decode.

4. The method of claim 3, wherein:
the PDSCH communications of the decoding candidate group are respectively associated with semi-persistent scheduling (SPS) configuration index numbers, and
selecting the single PDSCH communication of the decoding candidate group comprises selecting the PDSCH communication of the decoding candidate group associated with a lowest SPS configuration index number of the SPS configuration index numbers.

5. The method of claim 1, wherein applying the first management process comprises determining one or more groups of overlapping PDSCH communications, and assigning one PDSCH communication from each of the one or more groups of overlapping PDSCH communications to the first set of one or more PDSCH communications to decode.

6. The method of claim 5, wherein each PDSCH communication of the one or more groups of overlapping PDSCH communications is associated with a respective SPS configuration index number, and assigning one PDSCH communication from each of the one or more groups of overlapping PDSCH communications comprises assigning one PDSCH communication, from each of the one or more groups of overlapping PDSCH communications, associated with a lowest SPS configuration index number of the respective one or more groups of overlapping PDSCH communications.

7. The method of claim 5, wherein a first group of the one or more groups of overlapping PDSCH communications comprises an earliest PDSCH communication having an earliest symbol of the first subset of the plurality of PDSCH communications, and wherein each PDSCH communication in the first group overlaps with at least one other PDSCH communication in the first group.

8. The method of claim 1, wherein:
the plurality of PDSCH communications include one or more SPS PDSCH communications and one or more DG PDSCH communications,
the one or more SPS PDSCH communications are associated with respective SPS configuration index numbers, and
the method further comprises respectively assigning, to the one or more DG PDSCH communications, SPS configuration index numbers that are lower than the SPS configuration numbers associated with the SPS PDSCH communications,
the first management process comprises selecting, from the first subset of PDSCH communications, a PDSCH communication having a lowest SPS configuration index number, and
the second management process comprises selecting, from the second subset of PDSCH communications, a PDSCH communication having a lowest SPS configuration index number.

9. A method of managing multiple transmission and reception point (M-TRP) communications, comprising:
receiving, by a user equipment (UE), a plurality of physical downlink shared channel (PDSCH) communications each associated with a respective TRP;
selecting a subset of one or more PDSCH communications to decode by applying a management process for the plurality of PDSCH communications, wherein the management process comprises selecting the subset of one or more PDSCH communications to decode and excluding at least one of the one or more PDSCH communications from decoding, such that:
(i) no two PDSCH communications of the subset that are associated with a same TRP overlap, and
(ii) each PDSCH communication of the subset overlaps with at most one other PDSCH communication of the subset associated with a particular TRP; and
decoding the subset of one or more PDSCH communications to decode.

10. The method of claim 9, wherein applying the management process comprises:
initializing the plurality of PDSCH communications as a candidate set of PDSCH communications; and
iteratively, until an exit condition is reached:
(i) selecting, from the candidate set, a first survivor PDSCH communication that is associated with a first TRP for inclusion in the subset of one or more PDSCH communications to decode;
(ii) identifying any PDSCH communications of the candidate set that overlap with the first survivor PDSCH communication and that are associated with a second TRP different from the first TRP, and if any such PDSCH communications are identified, selecting one such PDSCH communication as a second survivor PDSCH communication for inclusion in the subset of one or more PDSCH communications to decode; and
(iii) updating the candidate set by:
removing the first survivor PDSCH communication and any PDSCH communication of the subset of candidate PDSCH communications that overlaps the first survivor PDSCH communication; and
if any PDSCH communication was selected as a second survivor PDSCH communication, removing the second survivor PDSCH communication and any PDSCH communication of the subset of candidate PDSCH communications that overlaps the second survivor PDSCH communication.

11. The method of claim 10, wherein the exit condition is that a number of completed iterations has reached a maximum number of PDSCH communications from two TRPs that the UE supports, or that the subset of candidate PDSCH communications is an empty subset.

12. The method of claim 10, wherein selecting, as the first survivor PDSCH communication, the PDSCH communication of the subset of candidate PDSCH communications that is associated with the first TRP comprises selecting a PDSCH communication having a lowest SPS configuration index number of the candidate PDSCH communications associated with the first TRP.

13. The method of claim 9, wherein:
the plurality of PDSCH communications include one or more SPS PDSCH communications and one or more DG PDSCH communications,
the one or more SPS PDSCH communications are associated with respective SPS configuration index numbers,
the method further comprises respectively assigning, to the one or more DG PDSCH communications, SPS configuration index numbers that are lower than the SPS configuration numbers associated with the SPS PDSCH communications, and
in the management process, the SPS configuration index numbers are used to select at least one PDSCH communication.

14. A method of managing multiple transmission and reception point (M-TRP) communications, comprising:
receiving, by a user equipment (UE), a plurality of physical downlink shared channel (PDSCH) communications each associated with a respective TRP;
selecting a subset of one or more PDSCH communications to decode by applying a management process for the plurality of PDSCH communications, wherein applying the management process comprises:
selecting a first PDSCH communication of the plurality of PDSCH communications, wherein the first PDSCH communication is associated with a first TRP;
identifying a first subset of PDSCH communications of the plurality of PDSCH communications associated with the first TRP and overlapping the first PDSCH communication, and excluding the first subset of PDSCH communications from decoding;
identifying a second subset of PDSCH communications of the plurality of PDSCH communications associated with a second TRP different from the first TRP and overlapping the first PDSCH communication;
selecting a second PDSCH communication from the second subset of PDSCH communications for decoding, and excluding unselected PDSCH communications from the second subset of PDSCH communications from decoding; and
excluding from decoding any of the plurality of PDSCH communications that overlap the second PDSCH communication from the second subset of PDSCH communications; and
decoding the subset of one or more PDSCH communications to decode.

15. The method of claim 14, wherein:
selecting the first PDSCH communication comprises selecting the PDSCH communication of the plurality of PDSCH communications having a lowest SPS configuration index number of the plurality of PDSCH communications, or
selecting the second PDSCH communication comprises selecting the PDSCH communication from the second subset of PDSCH communications having a lowest SPS configuration index number of the second subset of PDSCH communications.

16. The method of claim 14, wherein:
the plurality of PDSCH communications include one or more SPS PDSCH communications and one or more DG PDSCH communications,
the one or more SPS PDSCH communications are associated with respective SPS configuration index numbers,
the method further comprises respectively assigning, to the one or more DG PDSCH communications, SPS configuration index numbers that are lower than the SPS configuration numbers associated with the SPS PDSCH communications, and
in the management process, the SPS configuration index numbers are used to select at least one PDSCH communication.

17. A method of managing multiple transmission and reception point (M-TRP) communications, comprising:
receiving, by a user equipment (UE), a plurality of physical downlink shared channel (PDSCH) communications each associated with a respective TRP;
selecting a subset of one or more PDSCH communications to decode by applying a management process for the plurality of PDSCH communications, wherein applying the management process comprises:
initializing the plurality of PDSCH communications as a candidate set of PDSCH communications to decode; and
iteratively, until an exit condition is reached:
(i) identifying any PDSCH communications of the candidate set that are associated with a first TRP, and that do not overlap with any PDSCH communication of the candidate set associated with a second TRP different from the first TRP;
(ii) (a) if one or more PDSCH communications are identified in (i), selecting as a first survivor PDSCH communication one of the identified one or more PDSCH communications,
(b) otherwise, selecting as a first survivor PDSCH communication a PDSCH communication of the candidate set that has a lowest SPS configuration index;
(iii) including the first survivor PDSCH communication in the subset of one or more PDSCH communications to decode;
(iv) updating the candidate set by removing the first survivor, and removing any PDSCH communication of the candidate set that is associated with the first TRP and overlaps the first survivor;
(v) identifying any PDSCH communications of the candidate set that overlap the survivor PDSCH communication and that are associated with the second TRP, and if there are such PDSCH communications:
selecting as a second survivor PDSCH communication one of the such PDSCH communications, and
updating the candidate set by removing the such PDSCH communications, and removing any PDSCH communications of the candidate set that overlap the second survivor PDSCH communication and are associated with the second TRP; and decoding the subset of one or more PDSCH communications to decode.

18. The method of claim 17, wherein the exit condition is that a number of completed iterations has reached a maximum number of PDSCH communications from two TRPs that the UE supports, or that the candidate set is an empty subset.

19. The method of claim 17, wherein selecting as the first survivor PDSCH communication one of the identified one or more PDSCH communications comprises selecting a PDSCH communication having a lowest SPS configuration index number of the identified one or more PDSCH communications.

20. The method of claim 17, wherein:
the plurality of PDSCH communications include one or more SPS PDSCH communications and one or more DG PDSCH communications,
the one or more SPS PDSCH communications are associated with respective SPS configuration index numbers,
the method further comprises respectively assigning, to the one or more DG PDSCH communications, SPS configuration index numbers that are lower than the SPS configuration numbers associated with the SPS PDSCH communications, and
in the management process, the SPS configuration index numbers are used to select at least one PDSCH communication.

\* \* \* \* \*